United States Patent [19]

Willard et al.

[11] 3,931,883

[45] Jan. 13, 1976

[54] HORIZONTAL CONVEYOR LOAD MOVING APPARATUS

[75] Inventors: Edwin J. Willard, East Longmeadow; Leslie E. Carpenter, Jr., Southwick, both of Mass.

[73] Assignee: Longview Fibre Company, Longview, Wash.

[22] Filed: June 21, 1974

[21] Appl. No.: 481,762

[52] U.S. Cl. ............................ 198/218; 198/160
[51] Int. Cl.² .................................. B65G 25/04
[58] Field of Search ............ 198/24, 170, 176, 183, 198/218, 221, 222, 224, 160

[56] References Cited
UNITED STATES PATENTS

| | | | |
|---|---|---|---|
| 1,462,511 | 7/1923 | Lister | 198/218 |
| 2,106,220 | 1/1938 | Law | 188/82.84 |
| 2,569,108 | 9/1951 | Koch | 188/82.84 |
| 2,839,009 | 6/1958 | Francis | 198/170 X |
| 2,961,973 | 11/1960 | Bozman | 198/218 X |
| 3,100,043 | 8/1963 | Cordis | 198/224 |
| 3,197,023 | 7/1965 | Achammer | 198/221 |
| 3,512,337 | 5/1970 | Fitch | 198/221 X |
| 3,677,382 | 7/1972 | Coppel | 193/35 B |
| 3,768,629 | 10/1973 | Bennett et al. | 198/221 X |
| 3,799,327 | 3/1974 | Schulz | 198/170 |

FOREIGN PATENTS OR APPLICATIONS

| | | | |
|---|---|---|---|
| 1,136,393 | 12/1968 | United Kingdom | 198/183 |
| 1,201,249 | 9/1965 | Germany | 198/183 |
| 1,205,603 | 9/1970 | United Kingdom | 198/105 |

*Primary Examiner*—Evon C. Blunk
*Assistant Examiner*—Richard K. Thomson
*Attorney, Agent, or Firm*—Chapin, Neal and Dempsey

[57] ABSTRACT

A device for driving loads on a horizontal roller conveyor support between pick-up and delivery stations including a carriage mounted to travel back and forth below the conveyor level. The lower end of an upstanding lever arm is pivoted on the carriage and at the upper end of the arm a load engaging cylinder or roll is mounted with its axis forwardly (i.e. in a downstream direction) adjacent the vertical center line of the arm which is yieldably urged to remain at right angles to the plane of conveyor support. In the latter position the top of the roll is slightly elevated by a fraction of an inch above said load support plane. In operation at the pick-up station near the upstream end of carriage travel the roll can freely rotate under a load and the lever is thereby angularly set at an acute angle in the load driving direction. In the driving direction the roll is locked against rotation, and by the angularity of the lever arm as disclosed will exert the forces needed for efficiently overcoming load inertia and moving a wide range of load sizes under various conditions. While the roll is drivingly engaged and the carriage advances the pivoted lower end of the lever arm, the arm may, if necessary, be swung to a perpendicular relation to the support plane and beyond so as to increase horizontally applied force so that depending on load conditions the axis of the arm may either be trailing or leading the roll axis.

9 Claims, 6 Drawing Figures

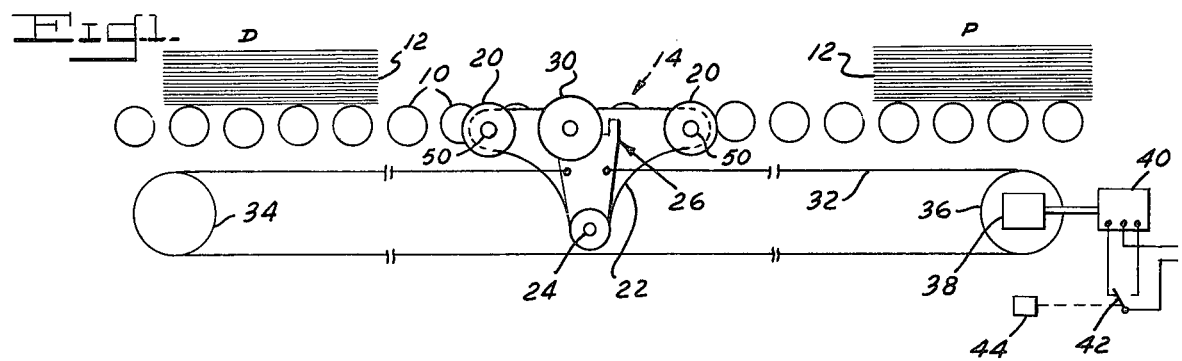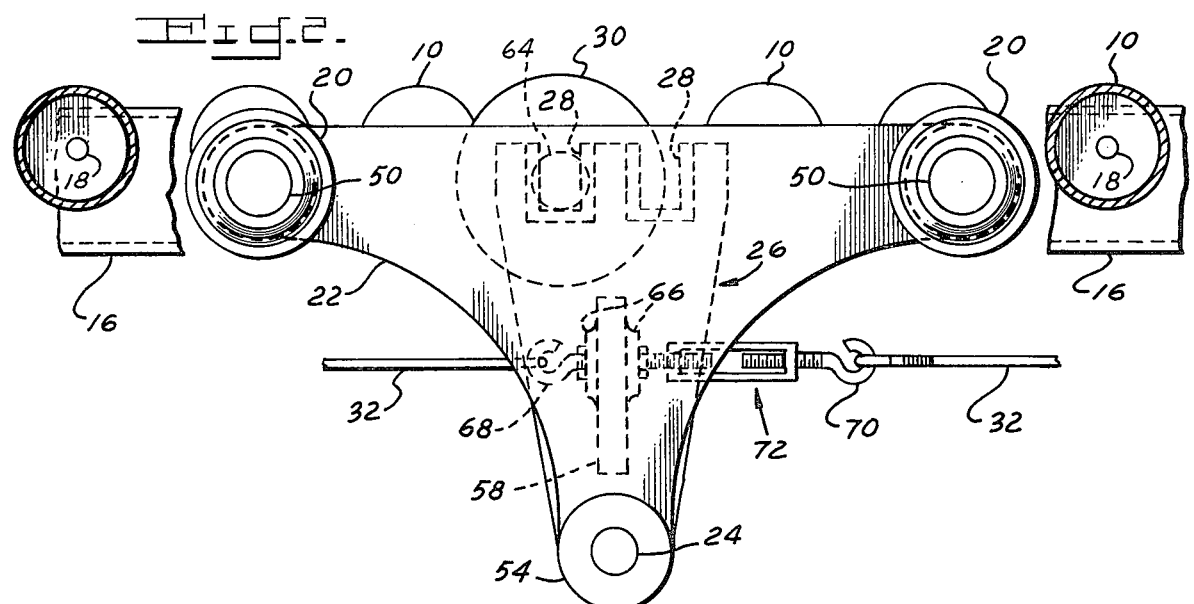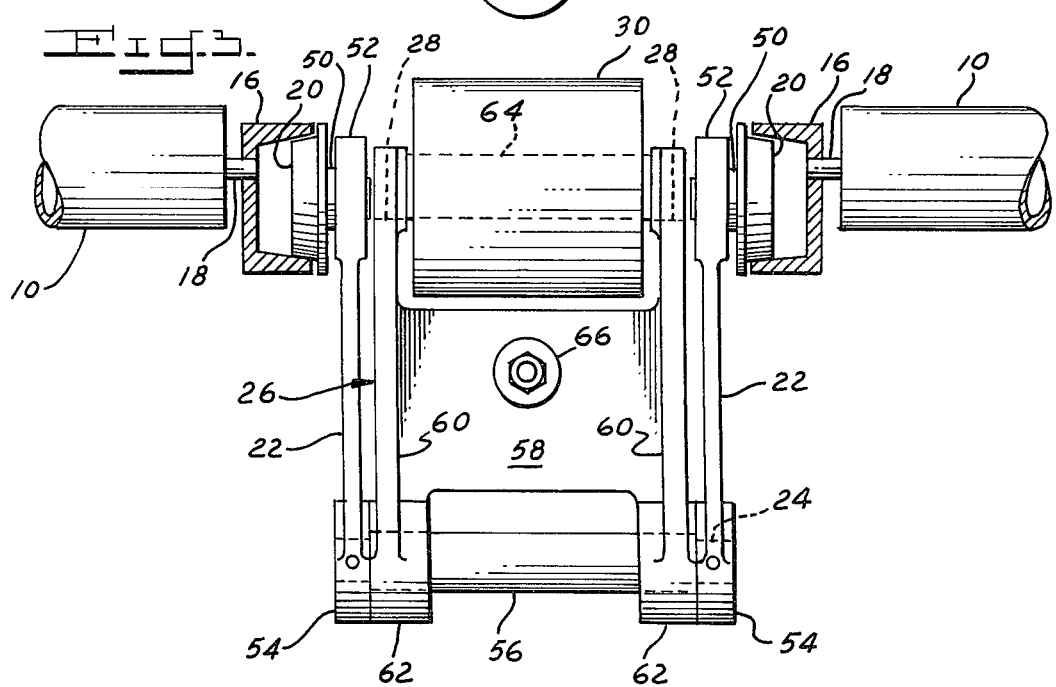

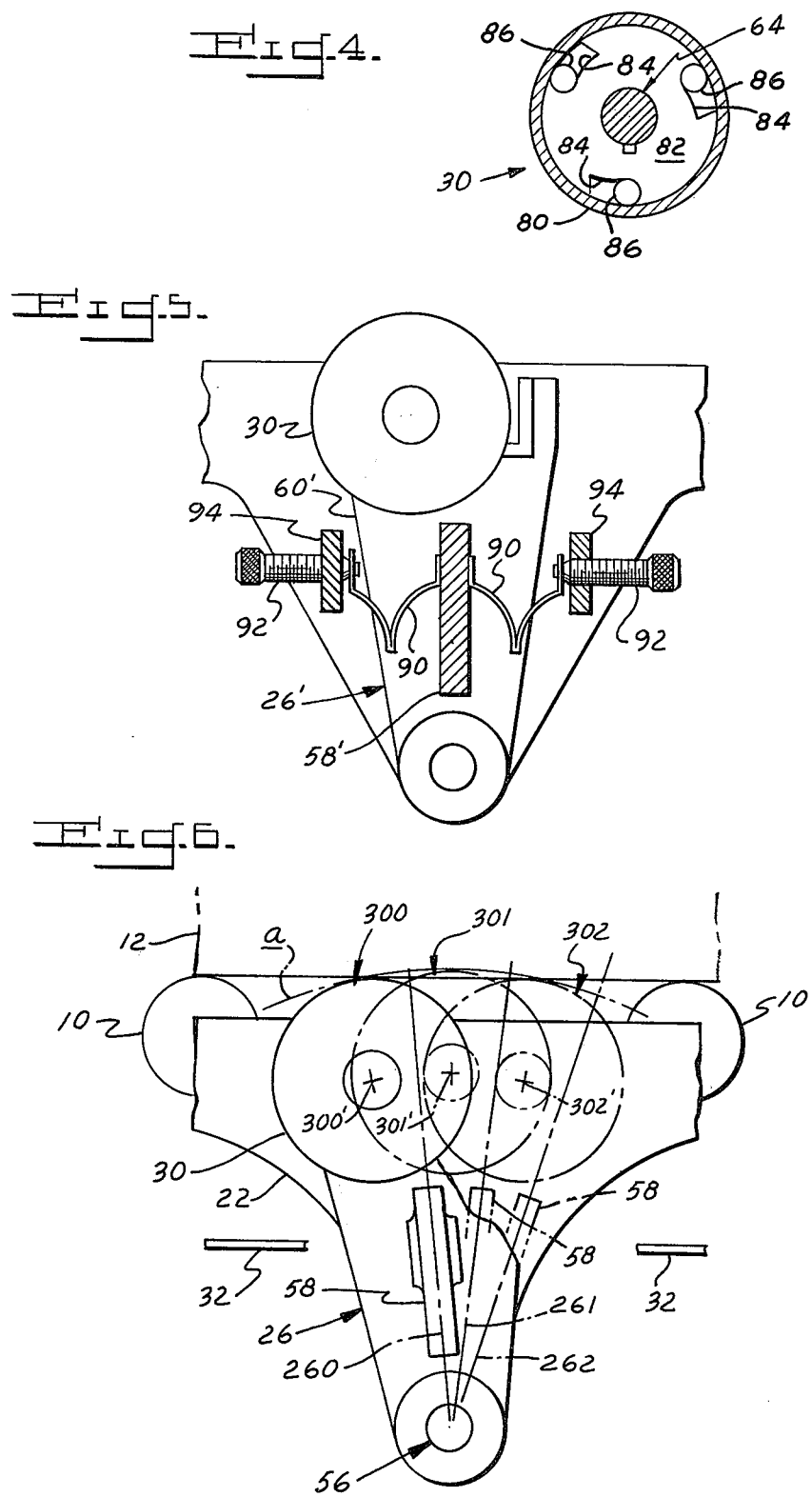

HORIZONTAL CONVEYOR LOAD MOVING APPARATUS

BACKGROUND

This invention relates to a load driving apparatus for moving rigid faced loads along a horizontal conveyor support surface and in particular to propelling stacks or piled bundles of relatively large rectangular sheets of corrugated paper board material and the like from one location to another as required for directing the same to various processing machine stations. The flat conveyor run comprises two parallel spaced flights of rollers supporting the bundles of sheets.

More specifically the invention relates to an improved apparatus for accomplishing the same overall purposes as are described in prior U.S. Pat. No. 3,768,629 for "Unit Load Conveying Apparatus" the nearest known prior art. In the device of the patent provision is made for a wedging action to lift and tilt the load until the forces applied in a horizontal downstream direction overcome the frictional resistance otherwise blocking horizontal movement. It is a primary object of the present invention to provide a different arrangement of propelling means for a more simplified and efficient handling of such loads.

SUMMARY

In a preferred embodiment of the invention as herein disclosed the device includes a carriage frame structure which may be mounted between spaced parallel roller flights of a typical conveyor and preferably supported thereby on the inner side rails of the flights for tracking purposes along the path of travel between a pick-up and a delivery station. On the carriage an upstanding lever arm member is pivoted at its lower end on a shaft fixed at the bottom of the carriage between opposing frame plates. The lever arm has side plates joined by a central connecting web, and between the upper edges of these plates is a load engaging roll having a clutch mechanism for free rotation of the roll surface in one direction only. The lever arm is yieldably held with its center line perpendicular to the plane of conveyor load support preferably by suitable adjustment of cable tension on a drum wound cable drive, the ends of the cable being fixed to opposite sides of the connecting web of the arm centrally between the arm and roll axes. Preferably the roll axis is slightly offset at the top of the arm in the direction of driving movement and when the center line of the arm is at 90° to the load supporting plane the top of the roll extends about one fourth inch above said plane. In operation the roll on a return stroke to the pick-up station freely rotates underneath it and cams the lever arm into an angular position in the driving direction. When the carriage is then reversed to move the load the roll locks against rotation and frictionally pushes against its underside in the direction of forward travel. Should load inerita resist movement horizontally the advancing lever arm pivot shaft will cause the roll to rise slightly and then fall into a trailing relation to the axis of the pivot shaft and thereby increase the frictional forces in a horizontal direction and move the load.

FIGURES

FIG. 1 is a line drawing schematically illustrating a conventional roll conveyor support and load driving apparatus of the present invention associated therewith;

FIG. 2 is a side elevational view of a carriage and drive unit embodying the present invention;

FIG. 3 is a front or rear end elevation of the unit shown in FIG. 2;

FIG. 4 is a diagrammatic representation of mechanism to provide for free rotation in one direction only of the cylindrical load contact roll of the unit shown by FIG. 2 and 3;

FIG. 5 is a fragmentary side elevational view of a modification of the lever arm mounting to support a contact roll in operative position; and FIG. 6 is a fragmentary schematic side elevational view to illustrate the action of the lever arm under various operating conditions.

DESCRIPTION

In the schematic of FIG. 1 conveyor rollers at 10 form a horizontal load supporting surface along which stacks of corugated sheets 12 or other rigid faced loads are to be propelled by the device as from an upstream pick-up station at P (at the right) to a downstream delivery station D (at the left).

A driver carriage unit embodying the invention is indicated generally by arrow 14. It is supported on tracking means for guided movement below the plane of the conveyor surface. The load bearing surface, as will be recognized, is provided by a conventionally formed conveyor installation having a pair of spaced parallel roller conveyor sections or flights on which the sides of a load rest and between which the carriage is mounted for travel below the midsection of the load. The spaced relation of the conveyor flights is indicated in FIG. 3, the inside end portions of rollers 10 being shown at each side and the inner side rails at 16 receiving the roller axles at 18. Side rails 16 are here shown as facing channel iron members in which wheels 20 of the carriage may ride for tracking purposes.

In the embodiment as disclosed herein, carriage 14 (FIGS. 2 and 3) is formed with spaced triangularly shaped frame plates 22. At the upper fore and aft corners of the plates are the wheels 20 which suspend the carriage between rails 16 for movement back and forth between the pick-up and deposit stations. Supported between the lower corners of the frame plates 22 are opposite ends at 24 of a pivot shaft on which a lever arm member generally designated by the arrow 26 is mounted for limited pivotal action as will be described.

In the upper edges of spaced upper end sections of the lever arm are notches as at 28 provided to carry a cylindrical load contact element as the roll 30. Roll 30 as will be later more fully described is designed on return travel back to station P to contact the front end of a load and roll freely underneath. When travel is reversed for driving a load in the downstream direction, roll 30 is locked against rotation and is adapted, if load conditions are such as to make it necessary, to be carried by pivotal action of lever 26 on the carriage to swing above the supporting plane of rollers 10 to a slight degree and cause movement of the load as will be later described in detail.

Referring again to FIG. 1 a drive means for moving the carriage is here schematically shown as a cable 32 having its ends fixed to lever arm 26, the cable being wound around drums at 34 and 36. Drum 36 is indicated as the cable driver and may be conventionally powered by a speed reducer 38 from a reversible electric motor 40. Switch 42 controls the direction of cable movement as directed by a control member at 44 which in turn may be energized by conventional sensing means (e.g. photoelectric limit switches, not shown) for the desired back and forth carriage movement. Such power and control means are in general common in the art and no further detail is deemed necessary.

Referring again to FIGS. 2 and 3 the carriage wheels 20 are supported for rotation on axle members 50 which are mounted in the upper corner bearing portions at 52 of the side frame plates 22. In the lower corner bearing portions at 54 of plates 22 the ends 24 of the pivot shaft at 56 are fixed. On shaft 56 is pivoted the lever member 26. The lever arm 26 assembly is here shown in the form of a casting having a central web connector section 58 joining opposite side plates 60 which extend above and below the central connecting web. Below the web a pair of spaced bearing portions at 62 engage shaft 56 for pivotal movement thereon. Above the web the facing sides 60 are formed at the top edges with notches as at 28 for seating the ends of axle member 64 of the contact roll 30.

Centrally of web 58 are bosses 66 provided with threaded holes in which cable attaching eyelets are mounted. The points of attachment are centrally between the axis of shaft 56 and axis of roll 30, and preferably are on opposite sides of the center line of the arm at about the mid-point thereof between the axis of shaft 56 and a line joining the axial positions of rolls 30 as set in the pairs of notches 28 on each side of the center line. As in FIG. 2 a simple eyelet 68 may be attached on one side while at the other side an eyelet 70 is part of a turnbuckle device 72 for adjusting the tension of cable 32. The cable thus provides a means for holding lever arm 26 erect and normally in vertically disposed relation on the pivot shaft 56. In practice it has been found that the cable tension will be satisfactory for efficient operation of the device when it is sufficiently taut to bring the vertical center line of arm 26 (passing through the pivotal axis of shaft 56) in perpendicular relation to the plane of the conveyor surface. In this condition the uppermost surface of contact roll 30 rests about one-fourth inch above the conveyor load supporting surface. The cable may be tightened to a greater degree if deemed desirable under various operating conditions and as may depend on such variables as the character or weight of the loads, the specific type of cable drive system, or the dimension of the contact roll and character of its surface. In practice stacks of corrugated board sheets have been efficiently moved by a smooth surfaced roll where the cable tension is sufficient to establish the lever arm relationship as above stated, and under these conditions stacks of various size sheets weighing up to 5,000 pounds have been successfully handled.

As previously mentioned the contact roll 30 is designed to rotate freely in one direction, i.e. on return travel to the pick-up station. Thus the roll will freely turn as it passes underneath the lower surface of the load and the load will remain stationary. When carriage travel is reversed the roll is locked against rotation so as to urge and drive the load in the desired direction. To accomplish such one-way rotation various well known clutch mechanisms are available as will be readily appreciated. In FIG. 4 one representative construction is schematically illustrated. As there indicated, an outer cylindrical wall 80 surrounds a central core section 82 indicated as keyed to shaft 64. In the outer edge of the core 82 a plurality of camming recesses 84 are provided in which pins 86 are held by the wall 80. The pins are shown at larger counterclockwise ends of the recesses 84. Thus, when wall 80 is urged to turn in a counterclockwise direction (as would be the case where the roll is carried from left to right underneath a load), contact with the underside of a load merely causes wall 80 to roll freely. When the direction is reversed wall 80 is urged to roll in a clockwise direction urging the pins 86 toward the smaller clockwise ends of the recesses and thus quickly become jammed against wall 80 to lock it against rotation for the load driving action.

It will be readily appreciated that shaft 64 of the roll 30 remains stationarily seated relative to the lever arm. As best seen from FIG. 2 the ends of the shaft may be flatted and fitted in position by dropping into the straight walled notches 28. It will be noted that matching pairs of notches 28 lie slightly offset to each side of the vertical center line of the lever arm 26. In FIG. 2 the shaft is set in the pair of notches to the left of the center line and the roll is thus offset slightly in the downstream direction. In the event the loads are to be driven in an opposite direction (i.e. from left to right) roll 30 may be lifted free of the left hand notches 28, turned end to end, and the ends of the axle 64 fitted into the other oppositely offset notches 28.

In FIG. 5 an alternative arrangement for yieldably "centering" the vertically disposed lever arm 26 (as in FIG. 2) is schematically shown. In this view the central web 58' of lever arm 26' is yieldably positioned as between leaf spring members 90 pressing against opposite sides of the web. The outer ends of springs 90 are each caught by the nose of an adjusting screw 92 threaded in a cross brace 94 fixed between sides 60' of the lever arm 26'. In contrast to the arrangement of FIGS. 1–3, this modification provides a lever positioning means independent of the carriage driving cable. As will be apparent the cable 32 may be attached directly to any rigid porton of the carriage frame or other suitable driving means may be used.

The action of lever arm 26 and contact roll 30 during a load pick-up and a load driving operation will now be described in somewhat greater detail and with reference to FIG. 6. the driving path of travel as in the other figures is assumed to be to the left.

In FIG. 6 it will be seen that the several angular positions of contact roll 30 and the lever arm with respect to the horizontal plane of support are here shown with the pivotal axis of the carriage shaft 56 at a single fixed location. These different positions at first glance might appear to involve lengthwise travel of roll 30 against the load whenever the arm swings from one position to another. As will be appreciated each position shown is, in fact, established or altered primarily as a result of the horizontal movement of the pivot shaft 56 below roll 30 and relative to it. The small amount of arcuate travel required for effective operation of the arm and roll assembly, together with the relatively slight elevation (on the order of four tenths of an inch) of the roll above the conveyor plane under certain operating conditions, is believed to be most readily apreciated as illustrated in FIG. 6, it being understood that in a driving operation the roll 30 remains engaged substantially at a single location against the load surface and regardless of the angle of arm 26. The center line positions of arm 26 at the various angular positions are indicated at 260, 261 and 262.

The completion of return travel as to the right at a pick-up station will first be described. Roll 30, being offset to the left on arm 26, will have initially contacted the forward edge of the load 12, and, as a result roll 30 will be cammed downwardly (about one-fourth inch) to roll freely underneath the load and impart counter-clockwise pivotal motion to arm 26. The angularity so imposed is shown by the full line arm position in FIG. 6 (center line at 260), the roll position here being designated by the arrow 300 (axis at 300'). Here the load rests evenly on the conveyor. It may be noted also that the cable drive is fixed at the approximate mid-point of arm 26 and so the axially offset roll not only aids effective cam action upon initially engaging a load, but will also serve to maintain the axis of pivot shaft 56 slightly ahead of roll 30 as the arm is moved to the right. This prevents any tendency for the upper end of arm 26 and roll 30 to move towards an upright 90° vertical relationship so that the likelihood of any shifting of a load in the wrong direction is eliminated. In this latter connection it was found that where the axis of a roll 30 is located directly on the vertical center line of the lever arm, some loads, particularly when of a light weight character, were occasionally shifted by the roll in the return direction. With the preferred slightly offset relationship as shown, a far wider range of load sizes and weights can be handled with consistently successful results at a pick-up ststion without causing any loads to shift on the return stroke.

At the end of each return stroke the arm is thus in the full line position shown and at any point along the length of the load unless the roll is carried past its rear edge as may occasionally occur. On reversing the cable drive for travel to the left, the initial effect, with the roll at the positiion 300, will be to establish frictional driving contact since the roll will almost immediately be locked against rotation. Under certain conditions, as may be due to a combination of various factors such as size and weight of a load or the nature of a relatively rigid load face, the loads may be propelled for the full length of travel without any perceptible pivotal motion of arm 26 on the carriage shaft 56 from its full line relationship.

Under other conditions an initial movement of the carriage to the left may fail to immediately overcome the inertia of a stationary load. If so, the load inertia will first cause a pivoting of lever arm 26 on shaft 56 since the shaft 56 will be drawn by the cable to advance underneath the axis of roll 30. The frictional "bite" against the load in a driving direction thus increases somewhat as the roll rises. As will readily be seen from considering the arc line at *a* and the relatively upright center line of arm 26 to start with, the rise will be gradual. In some cases a slight upward movement may be sufficient by itself to initiate and continue movement of the load without raising the latter off the conveyor. As previously stated the roll can be elevated to a relatively limited degree only above the plane of the conveyor support. The upper limit of vertical travel is reached when the center line of arm 26 swings beyond a 12 o'clock position as viewed (i.e. a 90° angular relation of the arm and plane of support) and brings the axis of roll 30 to the 12 o'clock position. This top position shown in phantom is indicated by the arrow 301 (axis at 301'). The center line of the arm is shown at 261. Depending on the relative rigidity of the load undersurface the roll may perhaps lift the load to a slight degree away from the conveyor surface or simply increase the frictional "bite" against the same. As above mentioned the rise above the supporting plane is on the order of four tenths of an inch.

Further resistance to load movement may continue pivotal action of the arm so as to carry the roll from its high point at 301 into a trailing relation with respect to the axis of shaft 56. The third roll position, indicated by the arrow at 302 (axis 302'), is the result of continued load inertia carrying the roll to the level at which the load underside again rests in the plane of the conveyor support. The arm center line in such case is at 262.

From extensive tests conducted under actual operating conditions it appears that with the roll at the position 302 the device is able to exert the maximum force for successfully moving loads forwardly in the desired direction and also that once load movement is commenced the arm may or may not remain at any given angular position for the duration of a full driving stroke. Under various conditions lever 26 may thus at times move from one angular position or another during delivery and either in a patterned fashion or at random.

The device of the present invention as herein disclosed in its preferred from has been found in practice to be an extremely reliable mechanism for efficient service in handling a large variety of sizes and weights of stacked corrugated or paperboard sheet bundles in a processing plant where certainty in the operation of an automated delivery system is essential. It will be apparent that other types of loads may be handled with comparable efficiency and beyond the capacity of any known prior devices.

What is claimed is:

1. Apparatus for moving a rigid faced load along a load supporting surface comprising a carriage member, tracking means supporting the carriage for guided movement back and forth along a predetermined path of travel below the plane of said surface, a load propelling member having an upstanding lever arm pivoted at its lower end on said carriage and a contact roll carried at the upper end of the arm for engaging a load, said roll having means for rotation only during carriage movement in an opposite direction to that of intended load travel, means normally maintaining said arm in a vertical position and yieldably holding said roll elevated above the pivotal axis of the arm with the uppermost roll surface closely adjacent to and above the plane of said load supporting surface and the roll axis adjacent to and offset, in the intended direction of load travel, forwardly of a plane extending radially from the pivotal axis of said arm in substantially perpendicular relation to the load supporting surface.

said arm being swingable forwardly and rearwardly of its said normal position, said yieldable means resisting pivotal swing of said arm in a direction opposite that of the carriage movement when said roll engages a load on said supporting surface, and in a load driving engagement of the roll and load being yieldable in response to variations in resistance during carriage movement for a shifting of said roll position back and forth between a forwardly offset and leading relation of roll axis to arm axis and a rearwardy offset and trailing relation thereof, said roll between leading and trailing axis positions rising and falling and exerting varying degrees of upward tilting pressure against the load to assist continued movement thereof in the desired direction.

and means to move said cariage back and forth along said path of travel.

2. The structure of claim 1, in which, the vertical center lines of said lever arm lies in said radial plane extending from the pivotal axis thereof substantially perpendicular to the load supporting surface when in said yieldably maintained vertical arm position.

3. The structure of claim 2, in which, said lever arm is yieldably maintained in the said substantially perpendicular relation by adjustable spring means.

4. The structure of claim 2, in which, the means to move the carriage is a reciprocable drum driven cable mechanism, the cable thereof being attached at opposite ends to fore and aft portions of said upstanding lever arm, said cable being under tension and yieldably maintaining said arm in its vertical position.

5. The structure of claim 4, in which, the attachment of the ends of said cable to the arm is approximately centrally between the pivotal axis of the lever arm and the axis of said contact roll.

6. The structure of claim 5, in which, said load supporting surface is in the form of a pair of spaced parallel roller type conveyor flights, said tracking means is provided by a pair of opposed channel members also providing the inner rails supporting the ends of the rollers of said conveyor flights, and said carriage includes a pair of side frame members having wheels riding in said channel members and supported thereby for guided movement along said path.

7. The structure of claim 6, in which, the pivot for said lever arm is a shaft connecting said carriage side frame members together at bottom portions thereof, said lever arm extends upwardly between the frame members and includes opposite side plates having transversely spaced upper portions between which said contact roll is mounted to extend across the top of said arm.

8. The structure of claim 7, in which, notched recesses in the upper edges of said side plates provide pairs of aligned recesses offset on each side of said center line of the lever arm, said contact roll having axially extending end supports engageable in each of said pairs of recesses for optionally selecting the load driving direction of the carriage.

9. The structure of claim 8, in which, said cable ends are fixed to a web between said side plates and at least one of said cable ends is provided with means for manually adjusting the tension of said cable.

* * * * *